Dec. 5, 1961  F. R. WILSON  3,011,371
TUBE CUTTING AND REAMING TOOL
Filed July 9, 1956  2 Sheets-Sheet 1

INVENTOR.
FRANK R. WILSON
BY DES JARDINS, ROBINSON & KEISER
HIS ATTORNEYS

Dec. 5, 1961          F. R. WILSON          3,011,371
TUBE CUTTING AND REAMING TOOL
Filed July 9, 1956                    2 Sheets-Sheet 2
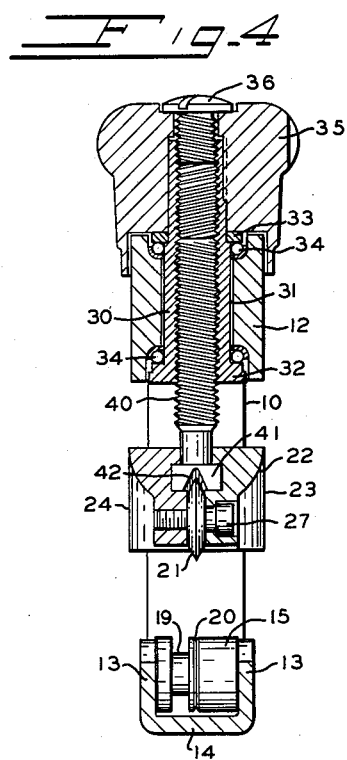
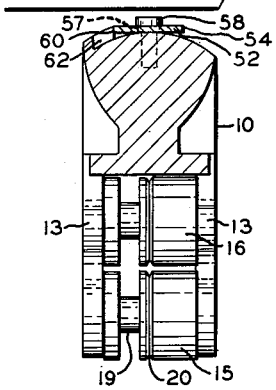
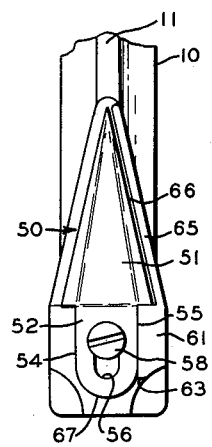
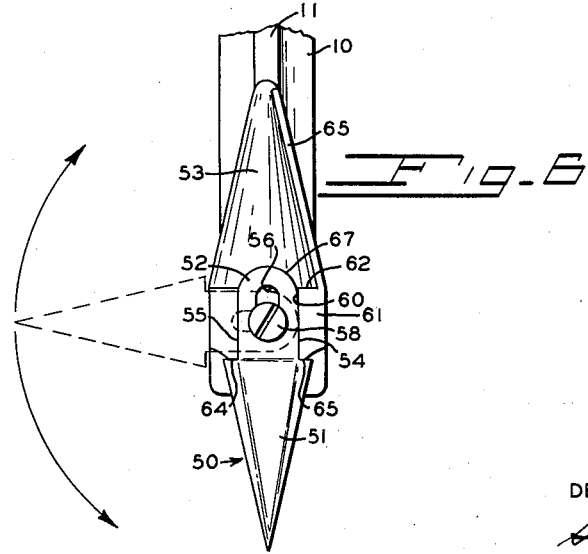
INVENTOR.
FRANK R. WILSON
BY
DES JARDINS, ROBINSON & KEISER
HIS ATTORNEYS 3,011,371
TUBE CUTTING AND REAMING TOOL
Frank R. Wilson, 4948 Briarcliff Road, Memphis, Tenn., assignor to Quinn Esther Wilson
Filed July 9, 1956, Ser. No. 596,723
4 Claims. (Cl. 77—73)

This invention relates to an improved form of tube cutting and reaming tool and, more particularly, to a tool of unusually small and compact design for handling a wide range of tubing sizes.

The present invention deals with a type of tube cutting tool having a cutter mounted on a slidable carriage which is fed toward and away from the tube supporting rollers by rotation of an internally threaded sleeve journaled in the tool body. As the sleeve is rotated by means of a knob affixed thereto, a feed screw secured to the carriage and meshing with the threads in the sleeve is moved relative to the tool body so as to feed the cutter toward or away from the tube supporting rollers. One object of the present invention is to provide an improved tool of the aforementioned type.

Another object of the invention is to provide an abutment surface on the carriage which is adapted to engage the tube supporting rollers and thereby limit the forward movement of the carriage and prevent the cutter from being moved into contact with the rollers.

Another object of the invention is to provide an improved type of locking arrangement for the reamer to hold it on the tool body in either an operative position or an inoperative position.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 4 is a cross-sectional view taken along the line 4—4 in FIG. 2.

FIG. 5 is a rear elevation of a portion of the tool as viewed in the direction of the arrows 5—5 in FIG. 2.

FIG. 6 is a view similar to FIG. 5 but showing the reamer moved to its operative position.

FIG. 7 is a cross-sectional view taken along the line 7—7 in FIG. 2.

Similar reference characters designate similar or identical elements and portions throughout the specification and throughout the different views of the drawings.

Figure 1:
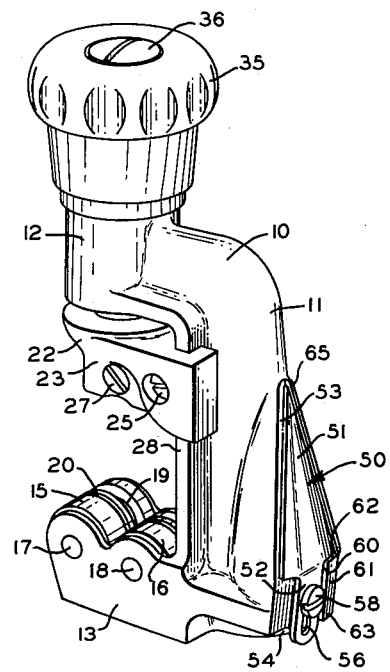
FIG. 1 is a perspective view of my improved form of tube cutting and reaming tool.
Figure 2:
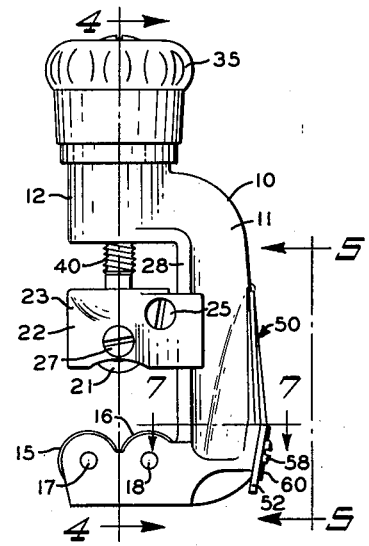
FIG. 2 is a side elevation of the tool shown in FIG. 1.
Figure 3:
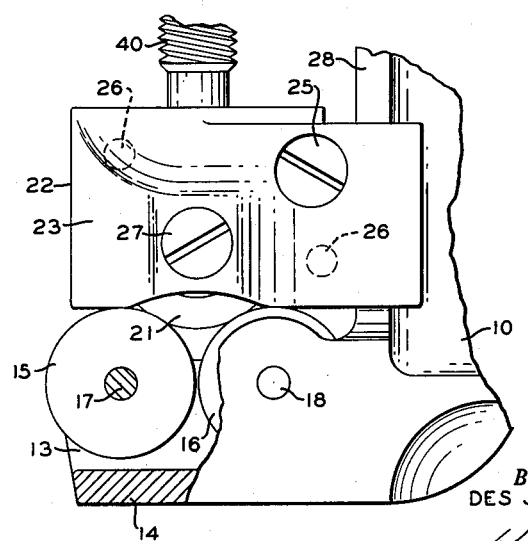
FIG. 3 is an enlarged view of the bottom portion of the tool shown in FIG. 1 with a portion of the body member broken away.

As best shown in FIGS. 1 and 2, the tube cutting and reaming tool includes a body member 10 which provides support for the various elements of the cutting and reaming devices. The body member is generally U-shaped and is preferably of die-cast construction. The frame is formed with a rather deep rib 11 for added strength and is provided at one end with a boss 12 for receiving the feed sleeve of the tube cutter and, at the other end, with a pair of spaced sidewalls 13 (FIG. 4) which are joined by a bottom web 14. A pair of grooved tube supporting rollers 15 and 16 are journaled for rotation between the side walls 13 by means of axles 17 and 18 which extend between and are supported at either end by the sidewalls 13. Each of the rollers 17 and 18 is provided with a deep U-shaped groove 19 for receiving a flare or bead on the tube to be cut, and with a smaller V-shaped groove 20 for receiving the beveled cutting edge of a wheel-type cutter 21. The entry of the edge of the cutter 21 into the grooves 20 permits smaller diameter tubing to be cut by the tool than would otherwise be possible. The cutter 21 is mounted in a carriage 22 which is of two-piece construction and includes a right half 23 and a left half 24 (FIG. 4). The two halves are held together by a cap screw 25 and a pair of locating dowels 26 (FIG. 3). The cutter 21 is received within a recess provided therefor in the carriage 22, and is journaled for rotation therein by means of a cap screw 27.

The carriage is arranged for sliding movement on the body member 10 by means of a groove provided in each of the halves 23, 24 of the carriage 22 which is formed to provide a sliding fit on one of the side flanges 28 of the body member 10.

Feeding movement of the carriage along the body member is effected by means of an internally threaded feed sleeve 30 which is journaled for rotation within a bore 31 provided in the boss 12. As shown in FIG. 4, the sleeve is arranged to be held against end-wise displacement within the bore by means of a flange 32 provided on the lower end of the sleeve, and a retaining ring 33 which is adapted to seat against a shoulder provided on an intermediate portion of the sleeve 30. The sleeve is preferably supported for rotation within the bore by means of anti-friction thrust bearings provided at either end of the bore. In the present embodiment of the invention, I have shown a ball-type thrust bearing provided for this purpose, this bearing including balls 34 which are received in a counterbore provided at each end of the bore 31.

The retaining ring 33 is held in position against the shoulder on the sleeve 30 by means of a knob 35 which is centrally bored to receive the upper end of the sleeve 30. The knob is held in place on the upper end of the sleeve by a cap screw 36 which meshes with the thread formed in the sleeve 30. As the screw 36 is tightened, the knob 35 will be forced downwardly on the sleeve and will bear against the retaining ring 33 and hold it against the shoulder on the sleeve.

The carriage 22 has secured thereto a feed screw 40 which meshes with an internal thread provided in the sleeve 30. At its lower end, the screw is formed with a square head 41 which is received in a correspondingly shaped recess provided in the halves 23 and 24 of the carriage. To reduce the length of the carriage and, thereby, the overall size of the tool, the head 41 is provided with a V-shaped groove 42 for accommodating the periphery of the cutter 21 as shown in FIG. 4. Upon turning the knob 35, the sleeve 30 will be rotated and cause the non-rotatable feed screw 40 to be fed in or out thereof which motion will also be imparted to the carriage carrying the cutter 21. The cutter may thus be advanced into the tube being cut as the tube is rotated on the supporting rollers 15 and 16.

By virtue of this feeding arrangement for the carriage which employs an internally threaded sleeve on the outer end of which the turning knob is mounted, I am able to provide a very compact tool which is capable of handling much larger diameter tubing for its size than any prior art cutter with which I am familiar.

To prevent the sharpened edge of the cutter 21 from engaging against the bottom of the grooves 20 in the rollers, the forward face of the carriage 22 is adapted to abut against the peripheral surfaces of the rollers 15 and 16, as shown in FIG. 3, before the edge of the cutter engages with the bottom of the grooves 20. Thus, dulling of the cutter by inadvertently forcing the sharpened edge thereof against the bottom of the grooves 20 will be prevented.

After a piece of tubing has been cut to the desired length, it is desirable to remove the burr formed on the inside of the tubing by the cutter 21. For this purpose, a blade-type reamer 50 comprised of a generally triangular blade portion 51 and a rectangular shank portion 52 is supported on the rear side of the body member 10.

As best shown in FIGS. 1 and 2, the blade portion 51 is, in effect, a sector of a conical surface. The conical shape of the blade is such that the internal radius of a cross-section through the blade is progressively less as one passes from the base of the blade toward the tip. The blade is provided with edges which terminate in a sharp point at the tip, and one or both of these edges may be a beveled cutting edge. The conical or scoop-shaped form of the blade makes it more effective as a reamer, since it it possible to insert the blade in the end of a tube and actually cut off the burr, rather than to scrape it off. As seen in FIG. 2, the shank 52 is inclined at an angle with respect to the blade and is provided with a pair of straight, parallel side edges 54 and 55 (FIG. 5) and an elongated slot 56. The slot snugly receives a tenon 57 (FIG. 7) formed on a shouldered screw 58 which is received in a tapped hole provided in the body member 10. The portion of the body member lying beneath the shank 52 is flattened to provide a bearing surface on which the shank may slide, while the portion 53 (FIG. 6) of the body member 10, lying beneath the blade 51, is shaped to conform to the curvature of the blade.

The reamer is adapted to be firmly held either in the inoperative position shown in FIG. 5 or in the operative position shown in FIG. 6 by co-operation of the side edges 54 and 55 with a shoulder 60 formed on an abutment 61 which projects upwardly from the body member 10. The abutment 61 is also provided with shoulders 62 and 63 formed on each end thereof with which shoulders 64 and 65 formed on the base of the blade 51 are adapted to co-operate.

To move the reamer from its inoperative position, as shown in FIG. 5, to its operative position, as shown in FIG. 6, the reamer is slid forwardly (upward as viewed in FIG. 5), to move the screw 58 into the outer end of the slot 56. Such upward movement of the reamer is permitted by virtue of a clearance 66 provided between a guard rib 65, formed on body member 10, and edge of the blade. As the reamer is moved upwardly, the blade 51 will lift off of the curved surface 53 due to the inclination of the shank relative to the blade. This will permit the cutting edge of the blade to clear the surface 53 as the blade is turned counterclockwise. The blade is then swung counterclockwise about the screw 58 to its operative, or extended position as shown in FIG. 6. Such movement of the blade is permitted by reason of the curvature 67 provided on the end of the shank 52 which, when the screw 58 is in the outer end of the slot 56 is concentric with the axis of the screw and is tangential to the side edges 54 and 55.

After the reamer has been turned to its operative position, it is then pushed upwardly to bring the screw 58 into the inner end of slot 56, as shown in FIG. 6 so as to lock the blade in position by virtue of the engagement of the straight side edge 54 with the shoulder 60. The shoulder 65 at the base of the blade 51, in this position, lies against the shoulder 63 formed on the abutment 61.

To return the blade from its operative position to its inoperative position, a reverse procedure is followed, the blade being first moved downwardly and then swung clockwise until it assumes an upright position whereupon it is slid downwardly to bring the straight side edge 55 into locking engagement with the shoulder 60 and the shoulder 64 on the base of the blade into contact with the shoulder 62. The reamer locking device just described provides a simple and effective means for holding the blade either in its inoperative position or in its extended, operative position.

While I have shown and described one embodiment of my invention herein, it is to be understood that it is capable of being carried out in a variety of ways. Changes, therefore, may be made in the construction and arrangement of my tube cutting and reaming tool without departing from the spirit and scope of the invention as expressed in the appended claims which are intended to encompass the patentable novelty inherent in my invention as broadly as is possible in view of the prior art.

I claim:

1. In a combined tube cutting and reaming tool of the type in which the tube cutter and reamer are both mounted on a common body member, the combination of a reamer having a blade portion curved in transverse section and a shank portion, said shank portion being provided with a pair of straight, parallel side edges and containing an elongated slot lying parallel to said edges and midway therebetween, a stud on said body member passing through said slot for fastening said reamer to said body member, an abutment portion on said body member having a straight shoulder thereon adapted to lie in contact with one of the other of said side edges along a substantial length thereof when the blade is either in operative position, extended from said body member, or in inoperative position, lying against said body member, and a surface portion on said body, against which the curved blade of the reamer lies when in inoperative position, mating said curved blade to further assist in retaining the reamer in its inoperative position.

2. The tool of claim 1 in which the distal end of said shank portion is provided with a curved surface which is concentric with the axis of said stud when the latter is located in the outer end of said slot.

3. In a combined tube cutting and reaming tool of the type in which the tube cutter and reamer are both mounted on a common body member, the combination of a reamer having a blade portion curved in transverse section and a shank portion, said shank portion being provided with a pair of straight parallel side edges and containing an elongated slot lying parallel to said edges and midway therebetween, a stud on said body member passing through said slot for fastening said reamer to said body member, an abutment portion on said body member having a straight shoulder thereon adapted to lie in contact with one or the other of said side edges along a substantial length thereof when the blade portion is either in an operative position, in which it is extended from said body member, or in an inoperative position, in which it lies against said body member, and a surface portion on said body, against which the curved blade of the reamer lies when in inoperative position, correspondingly curved with said blade to further assist in retaining the reamer in its inoperative position.

4. The tool of claim 3 wherein the shank portion of said reamer is inclined at an angle with respect to the blade portion thereof so as to cause the blade portion to move away from the curved surface on said body member when the reamer is moved to bring the stud into the outer end of the slot.

References Cited in the file of this patent

UNITED STATES PATENTS

| | | |
|---|---|---|
| 644,595 | Grabler | Mar. 6, 1900 |
| 1,207,339 | Stratton | Dec. 5, 1916 |
| 1,833,980 | Thewes | Dec. 1, 1931 |
| 2,466,179 | Milan | Apr. 5, 1949 |
| 2,630,028 | McIntosh | Mar. 3, 1953 |
| 2,630,029 | Franck | Mar. 3, 1953 |
| 2,784,618 | Franck | Mar. 12, 1957 |